United States Patent [19]

Rothlisberger

[11] 4,072,339

[45] Feb. 7, 1978

[54] HIGH GROUND CLEARANCE PASSENGER VEHICLE HANDLE APPARATUS

[76] Inventor: Melvin Albert Rothlisberger, 721 Fifth St., Elko, Nev. 89801

[21] Appl. No.: 705,676

[22] Filed: July 15, 1976

[51] Int. Cl.² .............................................. B60N 3/02
[52] U.S. Cl. ..................................... 296/71; 105/354; 224/45 R; 280/181
[58] Field of Search ................. 296/71; 280/181; 105/354; 16/125, 119; 224/45 R

[56] References Cited

U.S. PATENT DOCUMENTS

| | | | |
|---|---|---|---|
| 1,485,285 | 2/1924 | O'Gorman | 16/125 |
| 2,222,950 | 11/1940 | Itzcovitz | 105/354 |
| 2,261,395 | 11/1941 | Claud-Mantle | 105/354 |
| 2,288,708 | 7/1942 | Hinz | 105/354 |
| 2,586,986 | 2/1952 | Orrison | 105/354 |
| 2,768,590 | 10/1956 | Otto | 105/354 |
| 3,182,606 | 5/1965 | Osgood | 105/354 |

Primary Examiner—Joseph F. Peters, Jr.
Assistant Examiner—John A. Carroll
Attorney, Agent, or Firm—Trask & Britt

[57] ABSTRACT

A 'U'-shaped handle member is secured to the door post of a high ground clearance passenger vehicle to extend into the interior of the vehicle at an angle. The handle member is secured to the door post at a point along its vertical length to be graspable by the hand of a vehicle entrant and so that the entrant may apply a lifting force to assist himself into the vehicle.

5 Claims, 2 Drawing Figures

HIGH GROUND CLEARANCE PASSENGER VEHICLE HANDLE APPARATUS

BACKGROUND OF THE INVENTION

Field

This invention relates to vehicle accessories. More particularly this invention provides for handle apparatus to be secured to the door post of a high ground clearance passenger vehicle so that a vehicle entrant may grasp it and apply a lifting force to assist in entry thereto.

State of the Art

Many passenger vehicles of today have chassis which are elevated high above the ground (have a high ground clearance) as compared to conventional passenger automobiles. Examples of such vehicles include various all terrain vehicles, four-wheel drive vehicles, motor homes, mini buses, pick-up trucks, and vans. Such vehicles typically have doors of well known conventional form and function. Passenger and operator entry and egress is effected through such doors which are hinged to a door post to pivot about a substantially vertical axis. The door posts are typically vertical or functionally vertical in that some door posts have a segment which is slanted from the vertical proximate the windshield or wind screen of the vehicle.

To enter a high ground clearance vehicle, one must take a rather large step up. For persons who are strong and nimble, the step up requires some physical effort even though readily accomplished. For those who are short, not strong or nimble, entry may be a very difficult if not an impossible chore without help. Means to assist entry is therefor desirable.

Handle apparatus heretofore known have been limited to devices mounted to the dashboard or other structure of a vehicle to provide means for a passenger to hold on while the vehicle is in operation. Such handles are not formed or positioned to act as means to assist in vehicle entry. Further, such handles are typically formed and secured to withstand the limited forces exerted by a passenger while the vehicle is in operation.

Some large truck tractors are known to have handles mounted on the outside of their cabs proximate their doors to act as means to assist in entry. Such handles are formed and secured only for mounting external to the vehicle and only to tolerate forces limited in direction and magnitude.

SUMMARY OF THE INVENTION

A handle apparatus is comprised of a handle member and securing means. The handle member is 'U'-shaped and substantially circular in section. It is secured by the securing means to the door post of a high ground clearance passenger vehicle to form a 'D'-shaped opening and to extend into the exterior of the vehicle. The base and legs of the handle member are sized in length and section to be readily and comfortably grasped by the hand of a vehicle entrant. The handle member is secured to the door post at a point along its length to provide the entrant with means to apply a lifting force to assist in entry into the vehicle.

In another embodiment, the securing means is comprised of coacting apertures formed (1) in the door post and (2) proximate the distal ends of the legs of the handle member. Screws are inserted through the apertures in the distal ends into the door post. Preferably the distal ends of the legs are formed into flanges which are shaped to substantially conform to the surface of the door post. The handle member is preferably formed as a continuous tubular metal member. The handle member also preferably extends into the interior of the vehicle at an angle.

BRIEF DESCRIPTION OF THE DRAWINGS

In the drawings, which illustrate the best mode presently contemplated for carrying out the invention.

DESCRIPTION OF THE ILLUSTRATED EMBODIMENT

Figure 1:
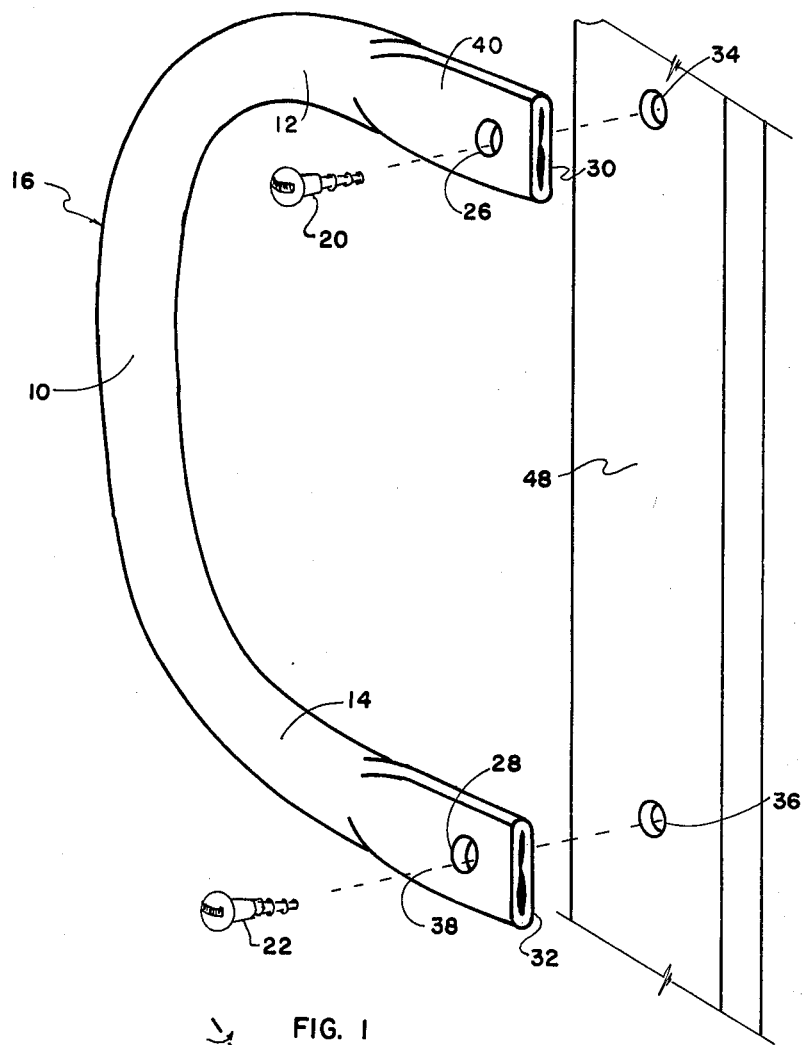
FIG. 1 is a perspective view of a handle apparatus of the invention.

The handle apparatus of FIG. 1 has a base 10 and legs 12, 14 extending therefrom to form a 'U'-shaped handle member 16 which is preferably substantially circular in cross section. The handle member 16 is secured to the door post 18 by securing means. As here illustrated, the securing means is comprised of screws 20, 22 which pass through first apertures 26, 28 formed proximate the distal ends 30, 32 of the legs 12, 14 and into corresponding second apertures 34, 36 in the door post 18. Other mechanical devices including nuts and bolts may also be used.

The distal ends 30, 32 of the legs 12, 14 are preferably formed into flanges 38, 40 which are shaped to substantially conform to the shape of the surface 42 of the door post 18. As here illustrated, the post surface 42 is generally flat; and the flanges 38, 40 are shown to be flat. As a result, a flush fit is obtained. It should be recognized however that the surface of the door posts may take a variety of shapes. The flanges can be preshaped or shaped by the user to secure the desired flush fit.

Figure 2:
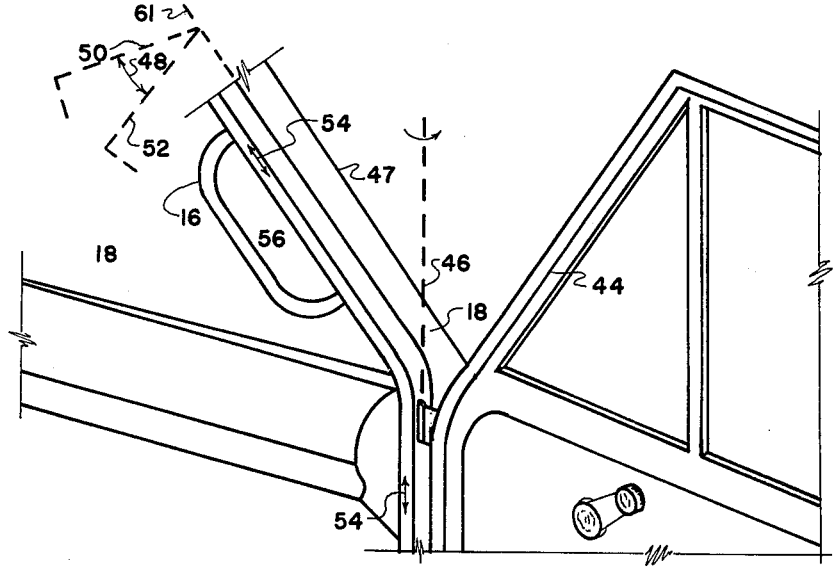
FIG. 2 is a perspective view of an installed handle apparatus.

Referring to FIG. 2, the handle member 16 is depicted installed to a door post 18 of a high ground clearance passenger vehicle. As shown the door 44 is hingedly secured to the functionally vertical door post 18 to pivot about a substantially vertical axis 46. That is, the door post 18 has a slanted portion 47 which functions as an integral part of the door post 18 in a manner well known to those skilled in the art. The handle member 16 is secured to the post 18 to extend into the interior 48 of the vehicle. In particular it extends diagonally into the interior at an angle 48 which may be described as the angle between a first plane 50 containing the legs 12, 14 of the handle member 16 and a second plane 52 parallel to the plane of the door 44 when closed. The angle 48 may be from about 25° to about 65° and is preferably about 35°. Installation at such an angle 48 ensures that the handle member 16 does not extend too far into the interior 18 to interfere with vision or become a protrusion safety hazard and yet far enough to not interfere with operation of the door 44. Also, positioning the handle member at such an angle places it in what has been found to be the optimum position for grasping and obtaining the desired lifting leverage by a vehicle entrant.

The handle member 16 is also positioned on the door post 18 at a point along its length 54 so that an entrant may grasp it and apply a lifting force to assist in entry. The handle number 16 is illustrated and positioned high enough (from the ground) so that it will be about shoulder height for an average adult sized entrant standing on the ground in a position ready to enter. It may be higher or lower in selected cases. It is essential however that it be positioned so that it can be reached by an average adult sized entrant when standing in a ready-to-enter position with the door 44 open and so that an average adult sized entrant can obtain lifting leverage therefrom to assist in entry.

As best shown in FIG. 2, the handle member 16, when installed, forms a 'D'-shaped opening 56. Referring to FIG. 2, the base 10 and legs 12, 14 of the handle member 16 are sized in length and in cross section so that an adult sized hand may readily and comfortably grasp the handle member. The base 10 is sized in length so that the inside distance 58 between the legs 12, 14 is from about 4 inches to about 10 inches and preferably from about 5 to 6 inches. The legs 12, 14 are sized in length so that the distance 60 between the distal ends 30, 32 and the inside of the base 10 is from about 3½ inches to about 6 inches and preferably from about 4 to 5 inches.

From FIG. 2, it can be seen that in using the handle apparatus of the instant invention, the lifting force applied by a vehicle entrant must be borne by the handle member 16 and securing means. That force will typically include a substantial rotational torque component. That is, the force will tend to rotate the handle member 16 about the door post axis 61. Accordingly, the handle member 16 should be constructed of a material and in a manner to withstand the rotational torque as well as the other component forces of the lifting force. That is, the handle member 16 should be structurally rigid and not susceptible to inelastic deformation or noticeable elastic deformation for the range of lifting forces which may reasonably conceivably be applied by various vehicle entrants.

It should be noted that the securing means must also be capable of withstanding the rotational torque component of the lifting force. In the instant embodiment, the flanges 38, 40 should be capable of withstanding the torque and other component forces of the lifting force without suffering inelastic or elastic deformation. Similarly, the screws 20, 22 must be of a thread size and of material construction to accept the torque and withstand the other component forces of the lifting force.

Although the handle member 16 can be constructed from a variety of materials in a variety of different ways with various cross sectional shapes, it is highly preferred that the handle member 16 be constructed from tubular metal in one unitary piece with the flanges 38, 40 formed at the distal ends 30, 32 as depicted. The outside diameter of the tubular metal may be from about ⅜ of an inch to about 1¼ inches and preferably about ⅝ of an inch. The tubular metal is preferably substantially circular in section and is a strong steel or iron alloy of about 1/16 inch wall thickness. The screws 20, 22 are preferably about a standard number 14 in size and made of a strong metal alloy.

The above stated sizing is preferred so that the handle member 16 is strong and durable while being small enough to not protrude a substantial distance into the interior 18 of the vehicle. Minimizing the protrusion is desirable as heretofore set forth.

It is to be understood that the embodiments of the invention herein described are merely illustrative of the application of the principles of the invention. Reference herein to details of the illustrated embodiments is not intended to limit the scope of the claims which themselves recite those features regarded as essential to the invention.

I claim:

1. In combination with a high-ground clearance passenger vehicle of the type having a door to permit entry thereinto and a functionally vertical door post cooperatively associated with said door, a handle apparatus comprised of:
   a base with legs extending away from opposite ends thereof to form a 'U'-shaped handle member;
   securing means to secure said handle member to said door post to extend away therefrom into the interior of said vehicle and to form a 'D'-shaped opening, said base and said legs being sized in length and section so that a hand may readily grasp said handle member;
   wherein said handle member is secured to said doorpost at a point along its length to be graspable by the hand of vehicle entrant and to provide said entrant with a means when grasped, to apply a lifting force to assist said entrant in entering said vehicle; and
   wherein said handle member is secured to said door post at an angle from about 25 degrees to about 65 degrees, said angle being the angle between a plane containing the legs of said handle member and a plane parallel to the door of said vehicle in a closed position.

2. The combination of claim 1 wherein said securing means is comprised of apertures formed proximate the distal ends of said legs to correspond with second apertures formed in said door post so that screws may be inserted through said apertures and into said door post to constitute the said securing means.

3. The combustion of claim 2 wherein the distal ends of said legs are formed into flanges shaped to substantially conform with the surface of said door post.

4. The combination of claim 3 wherein said base and legs are formed as a continuous tubular member and said handle member is substantially circular in cross section.

5. The combination of claim 4 wherein said handle member is fabricated of tubular metal.

* * * * *